US011556923B2

(12) United States Patent
Kadarmandalgi et al.

(10) Patent No.: US 11,556,923 B2
(45) Date of Patent: Jan. 17, 2023

(54) BLOCKCHAIN ENABLED SERVICE REQUEST SYSTEM

(71) Applicant: Visa International Service Association, San Francisco, CA (US)

(72) Inventors: Ashwini Kadarmandalgi, Fremont, CA (US); Sowmya Saiprasad, Union City, CA (US); Srinivas Vadhri, San Ramon, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 740 days.

(21) Appl. No.: 16/422,510

(22) Filed: May 24, 2019

(65) Prior Publication Data

US 2020/0372501 A1   Nov. 26, 2020

(51) Int. Cl.
| | |
|---|---|
| *G06Q 20/38* | (2012.01) |
| *G06Q 20/06* | (2012.01) |
| *G06Q 30/08* | (2012.01) |
| *H04L 9/06* | (2006.01) |
| *H04L 67/10* | (2022.01) |
| *H04L 67/55* | (2022.01) |
| *H04L 9/00* | (2022.01) |

(52) U.S. Cl.
CPC ....... *G06Q 20/3821* (2013.01); *G06Q 20/065* (2013.01); *G06Q 30/08* (2013.01); *H04L 9/0637* (2013.01); *H04L 67/10* (2013.01); *H04L 67/55* (2022.05); *H04L 9/50* (2022.05)

(58) Field of Classification Search
CPC ........ G06Q 20/00–425; H04L 9/00–50; H04L 67/00–75
See application file for complete search history.

(56) References Cited

U.S. PATENT DOCUMENTS

| | | | |
|---|---|---|---|
| 2018/0285979 A1* | 10/2018 | Chessell | G06Q 40/08 |
| 2019/0102850 A1* | 4/2019 | Wheeler | G06Q 20/405 |
| 2019/0325431 A1* | 10/2019 | Mann | H04L 9/3239 |
| 2020/0302563 A1* | 9/2020 | Golway | G06Q 30/0611 |

* cited by examiner

*Primary Examiner* — Mohammad A. Nilforoush
(74) *Attorney, Agent, or Firm* — Kilpatrick Townsend & Stockton LLP

(57) ABSTRACT

Systems and methods for establishing and fulfilling a smart contract between users and service providers are disclosed. A method includes creating, by one or more nodes in a computer network, a smart contract in response to a request from a user for services and providing the smart contract to a blockchain. The method then includes notifying service providers of the smart contract and receiving responses to the notifications from the service providers. Then the method includes identifying one or more service providers that can complete the service. The method then includes updating the smart contract to include data about the identified service providers. The updated smart contract includes account information for a user account of the user, and account information for service provider accounts of the identified service providers. Then a value interaction is initiated that pushes value from the user account to the service provider accounts.

16 Claims, 9 Drawing Sheets

BLOCKCHAIN ENABLED SERVICE REQUEST SYSTEM

CROSS-REFERENCE TO RELATED APPLICATIONS

None.

BRIEF SUMMARY

One embodiment of the invention includes creating, by one or more nodes in a computer network, a smart contract in response to a request from a user to obtain one or more services and providing, by the one or more nodes in the computer network, the smart contract to one or more blocks in a blockchain on one or more nodes in a blockchain network. The method then includes providing, by the one or more nodes in the computer network, notifications to a plurality of service providers in accordance with the smart contract and receiving, by the one or more nodes in the computer network, responses to the notifications from the plurality of service providers. Then the method includes identifying, by the one or more nodes in the computer network, one or more service providers from the plurality of service providers. The method then includes updating, by the one or more nodes in the computer network, the smart contract to include data relating to the one or more identified service providers, the updated smart contract including account information for a user account of the user, and account information for service provider accounts of the one or more identified service providers and initiating, by the one or more nodes in the computer network, a value interaction that pushes value from the user account to the service provider accounts.

Another embodiment of the invention includes a computer network node comprising: a processor and a computer-readable medium, coupled to the processor, comprising code, executable by the processor to implement a method including creating a smart contract in response to a request from a user to obtain one or more services and providing the smart contract to one or more blocks in a blockchain on one or more nodes in a blockchain network. The method then includes providing notifications to a plurality of service providers in accordance with the smart contract and receiving responses to the notifications from the plurality of service providers. Then the method includes identifying one or more service providers from the plurality of service providers. The method then includes updating the smart contract to include data relating to the one or more identified service providers, the updated smart contract including account information for a user account of the user, and account information for service provider accounts of the one or more identified service providers and initiating a value interaction that pushes value from the user account to the service provider accounts.

Another embodiment of the invention includes sending, by a user device, a request for one or more services to an interaction server computer. The method then includes receiving, by the user device from a node in a blockchain network, a notification about a bid from one or more identified service providers to complete the one or more services and sending, by the user device to the node in the blockchain network, an acceptance of the bid. Then the method includes sending, by the user device to the interaction server computer, an indication that the one or more services have been completed by the one or more identified service providers.

Another embodiment of the invention includes a user device comprising: a processor; and a computer-readable medium, coupled to the processor, comprising code, executable by the processor to implement a method including sending a request for one or more services to an interaction server computer. The method then includes receiving, from a node in a blockchain network, a notification about a bid from one or more identified service providers to complete the one or more services and sending, to the node in the blockchain network, an acceptance of the bid. Then the method includes sending, to the interaction server computer, an indication that the one or more services have been completed by the one or more identified service providers.

Further details regarding embodiments of the invention can be found in the Detailed Description and the Figures.

DETAILED DESCRIPTION

Figure 1:
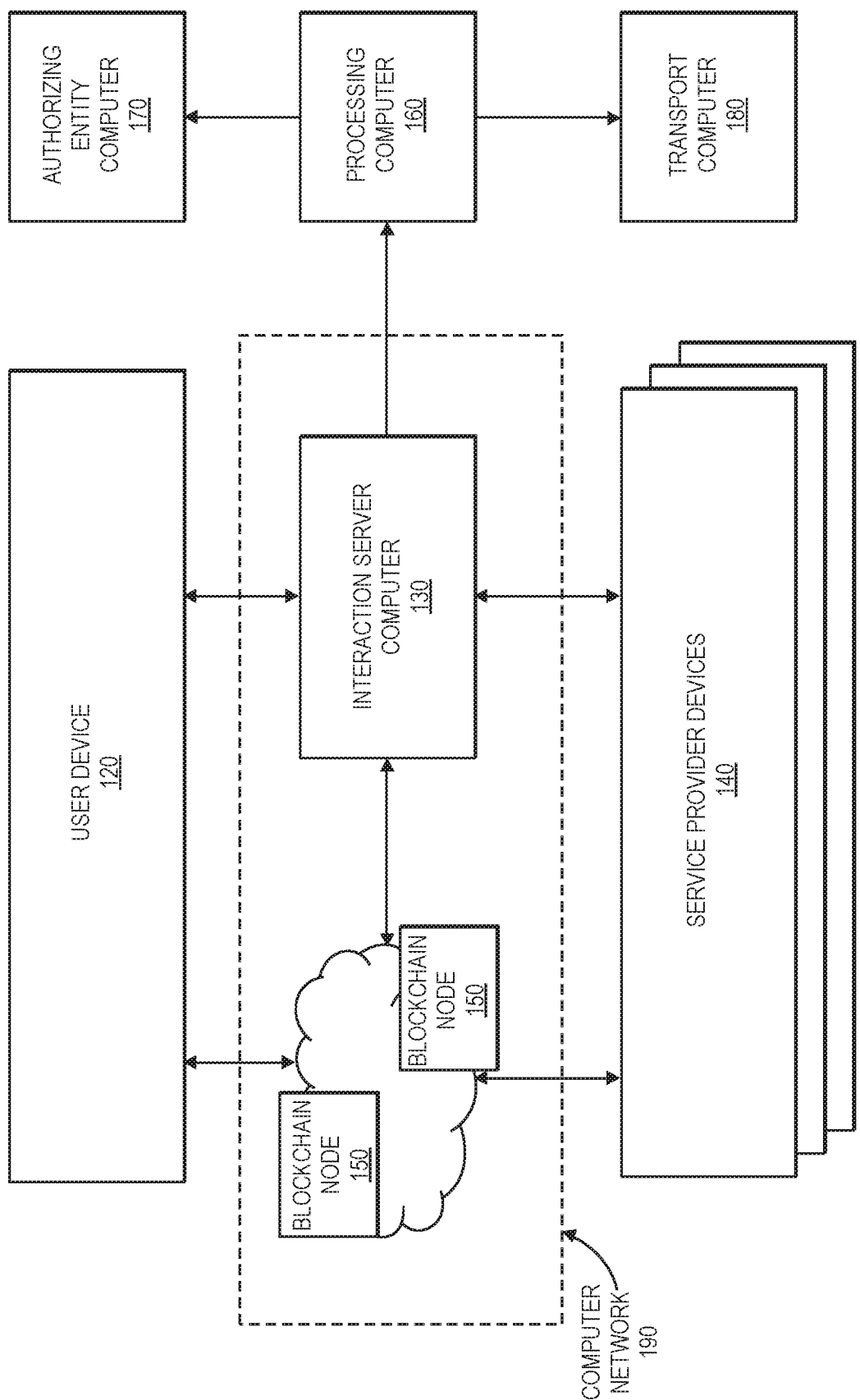
FIG. 1 is a block diagram of a system according to embodiments.

When booking services, there may be many places to look, and it may be difficult to find the best service provider. A user decides that they want one or more services. The user can then go to different service platforms, or to individuals, to identify the service providers that they want to hire. Additionally, the user may have to compare ratings and reviews for service providers between multiple service platforms and websites. Depending on the number of services that are desired and the number of service platforms, this can become a time-consuming process. In some cases, the user may have little to no guarantee about the quality of past work done by a service provider.

After finding the service provider, a user may want to ensure that the service is completed satisfactorily before committing to paying for the service. At the same time, a service provider may want to ensure that they will be paid before completing the service. Other entities with an interest in the interaction between the user and the service provider, such as service platforms and other users looking to hire the same service provider, may not have an effective way of holding the user and the service provider accountable. Transparency in the interaction between the user and service provider may thus be desirable.

Embodiments address these and other problems individually and collectively.

Embodiments relate to systems and methods to book services that make use of blockchain technology and push interactions. A user can request one or more services from a plurality of service providers. The user can initiate the generation of a smart contract through an interaction server computer for the one or more services. The smart contract can be sent to nodes of a blockchain network, and the blockchain nodes can notify a plurality of service providers who could potentially complete the one or more services. The plurality of service providers can then bid in an auction through the blockchain network to complete the one or more services. One or more of the service providers can be identified as the best service provider to complete the one or more services for the user, at least based on the bids. The identified service providers can then be added to the smart contract. Funds can be taken from the user, and when the user and the identified service providers indicate that the one or more services has been completed, the funds can be released to the identified service providers.

Prior to discussing embodiments of the invention, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with each other and other entities. Examples of user devices may include a mobile device, a laptop or desktop computer, a wearable device, etc.

A "service provider" may be an entity that performs services for a user. Examples of service providers include contractors, landscapers, babysitters, dog walkers, etc. Service providers may be associated with one or more online platforms (e.g., mobile applications, booking websites, service platforms, etc.). A "service provider computer" may include any system associated with a service provider. In some embodiments, the service provider computer may handle functionality of a mobile application and/or a website associated with the service provider or a service platform from which a user may book a service online.

An "acquirer" may be a business entity (e.g., a commercial bank) that has a business relationship with a particular service provider or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorizing entity computer.

An "issuer" may be a business entity (e.g., a bank) that maintains an account for a user. An issuer may also issue payment credentials stored on a user device, such as a cellular telephone, smart card, tablet, or laptop to the user.

A "payment processing network" may be data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. The payment processing network may use any suitable wired or wireless network, including the internet.

A "server computer" may be a powerful computer or cluster of computers. For example, the server computer can be a large mainframe, a minicomputer cluster, or a group of servers functioning as a unit. In one example, a server computer may be a database server coupled to a Web server. The server computer may be associated with an entity such as a merchant, payment processing network, a wallet provider, a merchant, an authentication cloud, an acquirer, or an issuer.

A "processor" may include any suitable data computation device or devices. A processor may comprise one or more microprocessors working together to accomplish a desired function. The processor may include CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

A "blockchain" can be a distributed database that maintains a continuously-growing list of records secured from tampering and revision. A blockchain may include a number of blocks of interaction records recorded on one or more nodes. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network.

A "smart contract" may be a computer protocol that can execute and facilitate a contract. The smart contract can be part of a blockchain. The smart contract can include identifiers of two or more entities involved in the contract. The smart contract can also include the terms of the contract (e.g., an end date for the smart contract). The smart contract may automatically enact the terms of the contract when some terms are triggered. In some embodiments, a smart contract may temporarily include only one entity. For example, a smart contract may temporarily include information about a user and services requested by the user and not information about service providers.

An "updated smart contract" may be a smart contract that has been updated with additional information. In particular, the updated smart contract may include one or more service providers in the smart contract.

A "value interaction" may be an interaction where value is transferred from one entity to another. Examples of value interactions may include payment and settlement interactions. Value may include currency, goods, cryptocurrency, etc.

A "service platform" may be a platform that provides an interface for users to book services with service providers. Individual service providers may register with a service platform to provider services.

FIG. 1 shows a block diagram of a system 100 that may be used in embodiments. System 100 may comprise a user device 120, an interaction server computer 130, a plurality of service provider devices 140, a blockchain network comprising a plurality of blockchain nodes 150, a processing computer 160, an authorizing entity computer 170, and a transport computer 180. Some components of system 100 may be in communication as a computer network 190. Nodes in the computer network 190 may include interaction server computer 130 and blockchain nodes 150. There may be other nodes in the computer network 190 that are not pictured in FIG. 1.

The components of system 100 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP), Hypertext Transfer Protocol (HTTP), Secure Hypertext Transfer Protocol (HTTPS), Secure Socket Layer (SSL), ISO (e.g., ISO 8583) and/or the like.

The user device 120 may be a mobile device, a smartphone, a laptop, etc. The user device 120 may be operated by a user (not shown). The user device 120 may have an application to communicate with the interaction server computer 130. The user device 120 may use the application to interact with the computer network. The user device 120 may or may not interact with the blockchain network directly.

Service provider devices 140 may be operated by a plurality service providers. Each service provider device 140 can have the same or different characteristics as the user device 120. There may be N service providers. The N service providers may provide similar or different services. For example, the plurality of service providers may include a pet walker, a house cleaner, etc. There may also be service providers that provide the same service. For example, 10 of the N service providers may provide lawn care services. The service provider devices may interact with the computer network through an application, or some service platform. In some embodiments, one or more of the plurality of service provider devices 140 may be associated with a service platform (e.g., Taskrabbit, Care).

The interaction server computer 130 may process value interactions. The interaction server computer 130 may also generate and update the smart contract. The interaction server computer 130 can interact with the processing computer 160 through an API. In some embodiments, the interaction server computer 130 may be a node in the blockchain network.

The blockchain network may comprise a plurality of blockchain nodes 150. In some embodiments, the interaction server computer 130 may be a blockchain node. In some embodiments, blockchain node 150 may be a computer of a service platform (e.g., TaskRabbit, Care) in which independent service providers can connect with users that want services to be completed. The blockchain of the blockchain network may also comprise a plurality of blocks. Each block may comprise a smart contract, a bid for a smart contract, or a record of a service completion.

The processing computer 160 may be part of a payment processing network. The processing computer 160 may receive value interaction request messages from interaction server computer 130. The processing computer 160 may also generate and send value interaction messages to an authorizing entity computer 170 and/or a transport computer 180. In some embodiments, the value interaction messages may be account funding transaction (AFT) or original credit transaction (OCT) messages. In some embodiments, the processing computer 160 may be part of the computer network 190.

The authorizing entity computer 170 may be operated by an authorizing entity. The authorizing entity may maintain an account of the user. For example, the authorizing entity computer 170 may be operated by an issuer. The authorizing entity computer 170 may authorize value interactions. For example, the authorizing entity computer 170 may decline a value interaction for a high volume of service requests, or for a service with a service provider known to be fraudulent. In some embodiments, the authorizing entity computer 170 may also authenticate the user before the user is able to request services.

The transport computer 180 may be operated by a second authorizing entity. The second authorizing entity may be an authorizing entity or an acquiring entity that maintains one or more accounts for the one or more service providers. There may be one or more transport computers 180. Each service provider may have an account with a different transport computer 180. Some service providers may have accounts with the same transport computer 180.

Figure 2:
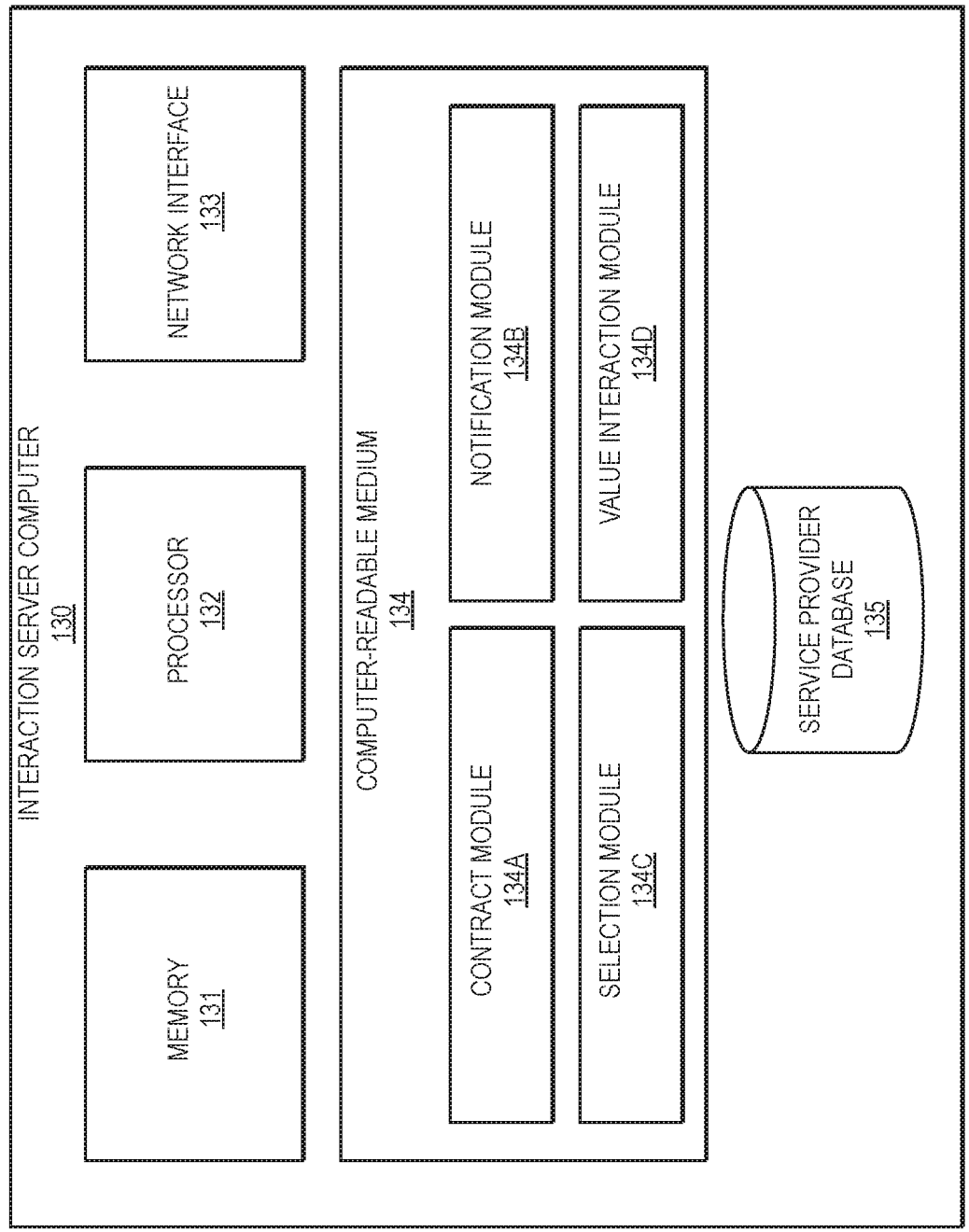
FIG. 2 is a block diagram of an interaction server computer according to embodiments.

FIG. 2 shows a block diagram of an interaction server computer 130 according to an embodiment. The interaction server computer 130 may comprise a memory 131, a processor 132, a network interface 133, a computer-readable medium 134, and a service provider database 135. Computer-readable medium 134 may store code executable by the processor 132 for implementing some of all of the functions of interaction server computer 130 described herein. The computer-readable medium 134 may include a contract module 134A, a notification module 134B, a selection module 134C, and a value interaction module 134D.

The memory 131 may be implemented using any combination of any number of non-volatile memories (e.g., flash memory) and volatile memories (e.g., DRAM, SRAM), or any other non-transitory storage medium, or a combination of media.

The processor 132 may be implemented as one or more integrated circuits (e.g., one or more single core or multicore microprocessors and/or microcontrollers). The processor 132 may be used to control the operation of the interaction server computer 130. The processor 132 can execute a variety of programs in response to program code or computer-readable code stored in memory 131. The processor 132 may include functionality to maintain multiple concurrently executing programs or processes.

The network interface 133 may be configured to connect to one or more communication networks to allow interaction server computer 130 to communicate with other entities such as a user device 120, a service provider device 140, a blockchain node 150 etc. For example, communication with a blockchain node 150 can be direct, indirect, and/or via an API. Some examples of network interface 133 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 133 may include Wi-Fi™.

The contract module 134A, in conjunction with the processor 132, may generate and update smart contracts. The contract module 134A may receive a service request message from a user device. The service request message may include a user identifier, user account information a type of service or services requested, a service start date and end date, etc. The contract module 134A, in conjunction with the processor 132, may also update smart contracts. A smart contract can be updated with a service provider identifier and service provider account information for one or more identified service providers that will complete the service for the user. The smart contract may be stored on a blockchain. In some embodiments, the contract module 134A, in conjunction with the processor 132, may need consensus from other blockchain nodes in the blockchain network before updating the smart contract. The updated smart contract may then be saved to the blockchain.

The notification module 134B, in conjunction with the processor 132, may notify service providers of a service request from a user. The notification module 1348, in conjunction with the processor 132, may generate notifications based on the service request. The notification may include a type of services or services requested, dates of the service, etc. Notifications may be sent, for example, by SMS message or by email. The notification module 134B, in conjunction with the processor 132, may query the service provider database 135 for service provider contact information (e.g., a phone number, an email address). The notification module 134B, in conjunction with the processor 132, may send a notification to each service provider that has the same type as the type of services in the service request. For example, if the type of service in the service request is "home cleaning", the notification module 134B, in conjunction with the processor 132, may send notifications to service providers with a type of "home cleaning." The notification module 134B, in conjunction with the processor 132, may query service provider database 135 to determine relevant service providers. For example, the notification module 134B, in conjunction with the processor 132, may use the service provider database 135 to determine a list of all service providers with the type "home cleaning." In some embodiments, the notification module 134B, in conjunction with the processor 132, may send the notification to one or more nodes in a blockchain network.

The selection module 134C, in conjunction with the processor 132, can identify one or more service providers to complete a service for a user based on bids placed by a plurality of service providers. The selection module 134C may receive notifications of a plurality of bids placed by a plurality of service providers. For example, service provider device A may have sent a bid of $15 per hour to mow a user's lawn while service provider device B may have sent a bid $10 per hour for the same user. The selection module 134C, in conjunction with the processor 132, may then determine the best bid for the service requested by the user. For example, the service provider with the lowest bid may be selected. The selection module 134C, in conjunction with the processor 132, may identify the service provider that placed the best bid. Additionally, or alternatively, the selection module 134C, in conjunction with the processor 132, may use other criteria for selecting a service provider (e.g., rating, service provider location, completion rate, number of services completed). For example, the service provider with the lowest bid and a completion rate greater than 90% may be identified. In some embodiments, the criteria for selecting a bid and service provider may be part of a smart contract.

The value interaction module 134D, in conjunction with the processor 132, can initiate value interactions. The value interaction may be initiated based on a smart contract, after the service in the smart contract has been completed or when the terms of the smart contract dictate that a value interaction should be initiated. For example, the smart contract may be for a recurring weekly gardening service and have terms that a value interaction should be initiated monthly. In some embodiments, the value interaction may use an AFT message and/or an OCT message. In initiating the value interaction, the value interaction module 134D, in conjunction with the processor 132, may send a value interaction request message to a processing computer. The value interaction request message may include the interaction value, a user account identifier, and a service provider identifier. If the smart contract includes multiple service providers, the value interaction module 134D, in conjunction with the processor 132, may send a value interaction request message for each service provider. The value interaction module 134D may initiate a value interaction in response to receiving an indication from a user device and/or a service provider device that the service has been completed satisfactorily.

The service provider database 135 may store information about service providers. The service provider database 135 may store service provider identifiers, types of services done by the service provider, contact information for service providers, etc. For example, for service provider A, the service provider database 135 may store an identifier for service provider A, a phone number and email address, and that service provider A can provide dog walking and pet sitting services. Information in service provider database 135 may be received from the service provider during enrollment. In some embodiments, the information may be received from a blockchain node 150. The service provider database 135 may also store service provider information such as service provider ratings, service job completion rates, etc. For example, for service provider A, the service provider database 135 may store data indicating that service provider A has been selected for 20 service jobs, has completed 95% of past service jobs satisfactorily, and has an average rating from users of 4.5 out of 5. In some embodiments, the service provider database 135 may maintain an index of service platforms that service providers are affiliated with. For example, service provider database 135 may store data indicating that service provider A has an account on the service platform Rover. Additionally, or alternatively, the service provider database 135 may store identifiers for service providers affiliated with a particular platform. For example, service provider database 135 may store a list of service providers with an account on Rover.

Figure 3:
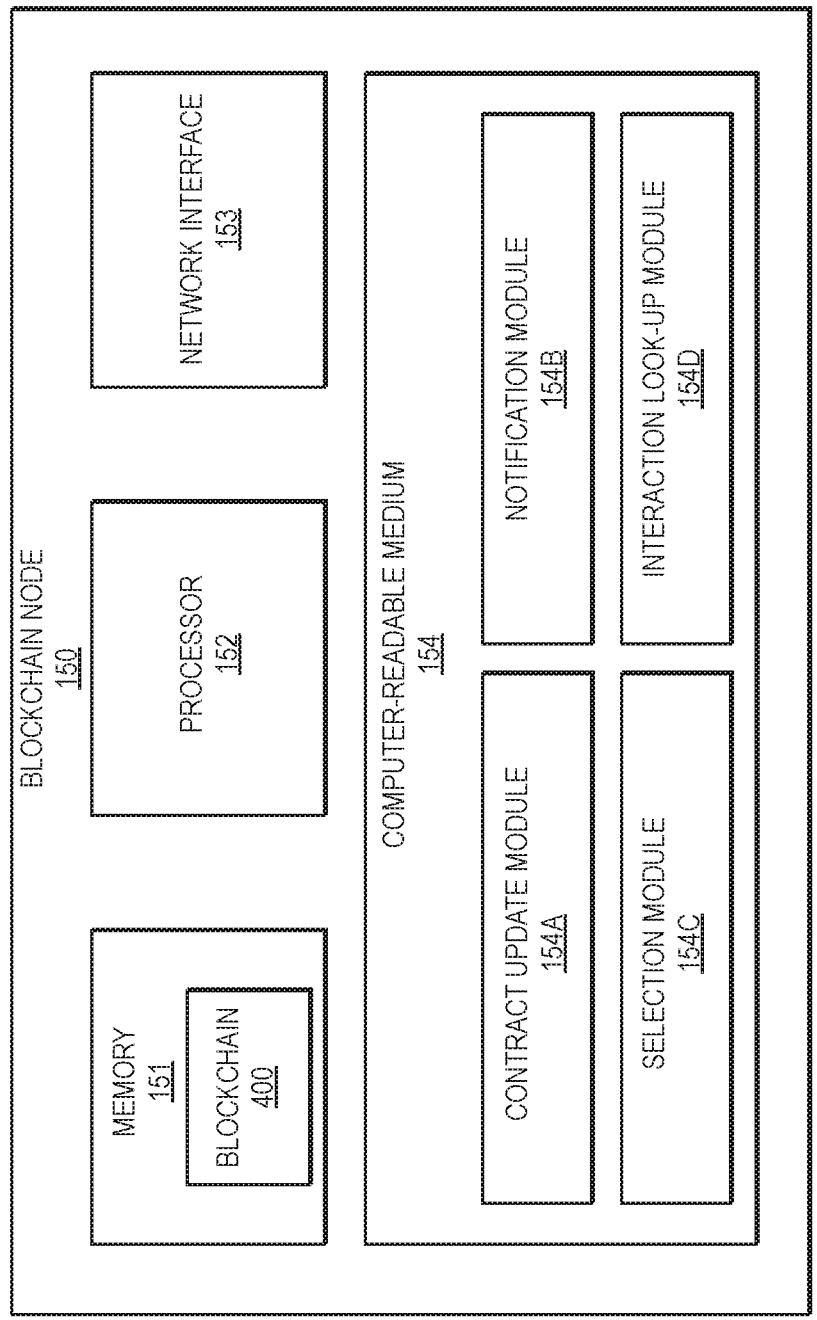
FIG. 3 is a block diagram of a blockchain node according to embodiments.

FIG. 3 shows a block diagram of a blockchain node 150 according to an embodiment. The blockchain node 150 may comprise a memory 151, a processor 152, a network interface 153, and a computer-readable medium 154. These components may be similar to of different than the corresponding components in the interaction server computer 130 of FIG. 2. Computer-readable medium 154 may store code executable by the processor 152 for implementing some or all of the functions of blockchain node 150 described herein. The computer-readable medium 154 may include a contract update module 154A, a notification module 154B, a selection module 154C, and an interaction look-up module 154D. In some embodiments, a blockchain node 150 may have additional capabilities, such as in the case where interaction server computer 130 is a node in the blockchain.

Each blockchain node 150 may maintain a blockchain 400 comprising a plurality of blocks. The blockchain 400 may be stored in the memory 400. In some embodiments, a blockchain node 150 may store a portion of the blockchain 400. Each block in the blockchain 400 may comprise a smart contract, a smart contract bid, an updated smart contract, or a notification of a service completion.

The contract update module 154A, in conjunction with the processor 152, can update smart contracts with information about the service providers. For example, the contract update module 154A, in conjunction with the processor 152, may update a smart contract with a service provider identifier and an identifier of a service provider account associated with the service provider after the service provider is selected to complete a service for a user. The smart contract may be stored on a blockchain, and so the contract update module 154A, in conjunction with the processor 152, may need consensus from other blockchain nodes in the blockchain network before updating the smart contract. The updated smart contract may then be saved to the blockchain.

The notification module 154B may have similar or different characteristics as the notification module 134B in FIG. 2. Notifications may be sent, for example, by SMS message, by email, or through an application on a service provider device (e.g., an application of a service platform). In some embodiments, blockchain node 150 may be a computer of a service platform (e.g., Taskrabbit, Care). Then, notification module 154b, in conjunction with the processor 152, may notify service providers by posting the service request on the service platform. The service provider computer may then be notified using notification services of the service platform.

The selection module 154C may have similar or different characteristics as the selection module 134C in FIG. 2.

The interaction look-up module 154D, in conjunction with the processor 152, may retrieve information about value interactions. For example, the interaction look-up module 154D, in conjunction with the processor 152, may determine a status of a value interaction (e.g., initiated, completed, rejected). The interaction look-up module 154D may provide an API for communicating with the interaction server computer 130. The interaction look-up module 154D, in conjunction with the processor 152, may query the interaction server computer 130 to determine processing status of a value interaction. The interaction look-up module 154D may send a value interaction query to the interaction server computer 130 with a transaction ID and a service interaction ID. The transaction ID may allow the interaction look-up module 154D to query information about the value interaction in various stages (e.g., the status of an AFT transaction, an escrow account, an OCT transaction). The service interaction ID may allow the interaction look-up module 154D to query information about the entire service interaction. This can, for example, identify a value interaction that was canceled because a service provider failed to complete the service.

Figure 4:
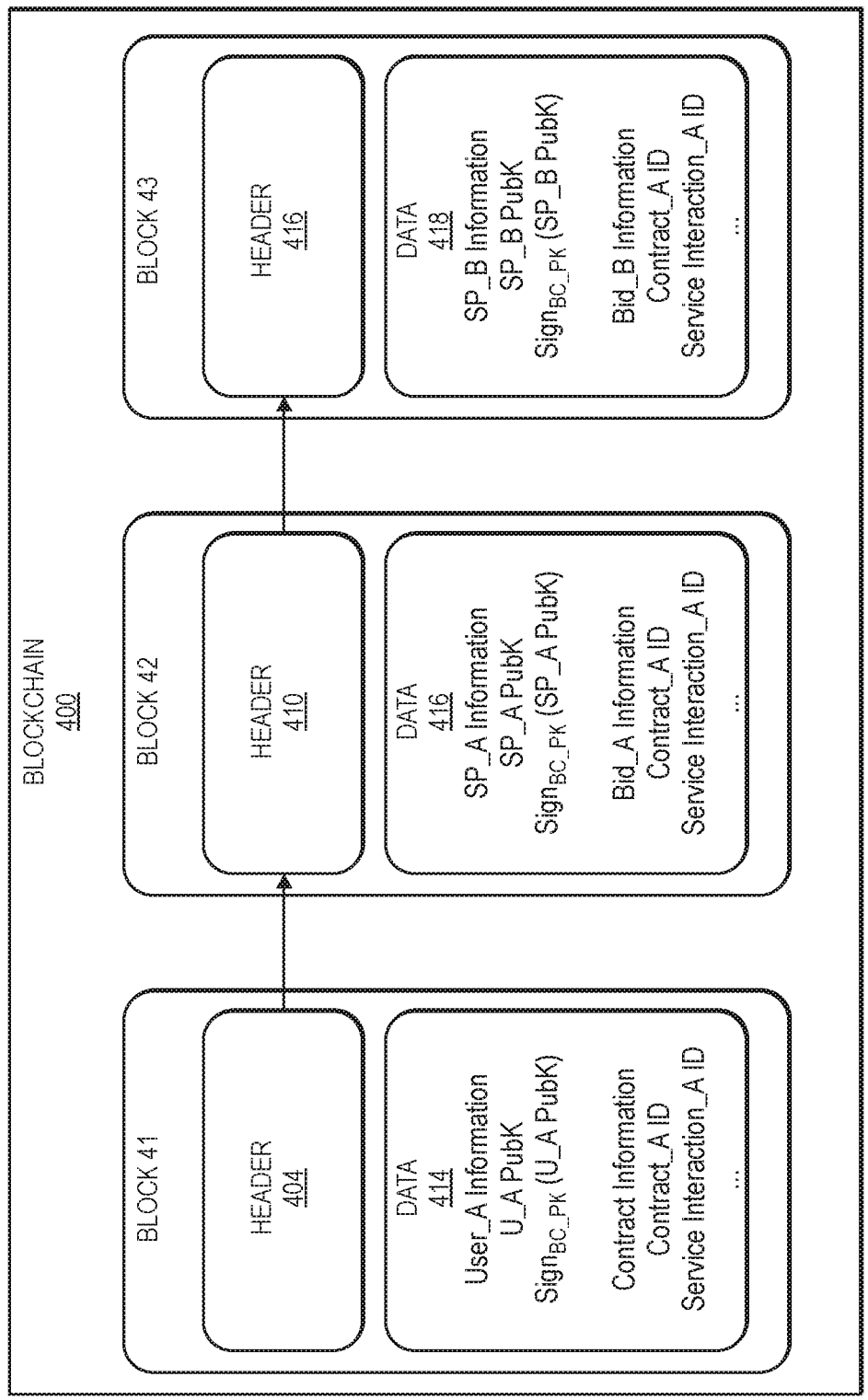
FIG. 4 is an example of a portion of a blockchain according to embodiments.

FIG. 4 shows an example of a portion of a blockchain 400, which may include a number of blocks 41, 42, 43, each block including respective headers 404, 4010, 416. Each header may include data elements including version numbers, previous block hashes, merkle roots, and timestamps. Each block may also include data including information about each entity being registered (e.g., name, address, phone number, e-mail address, etc. of a user or service provider), an identifier for the entity (e.g., a public key of the entity), and a digital signature (e.g., a public key of the entity signed by the blockchain 400 or the blockchain node of the blockchain 150).

As an example, block 41 may comprise information about a smart contract and block 42 and block 43 may comprise information about bids from service providers for the smart contract. User_A Information may be information about a particular user (e.g. the name, contact information, and address). U_A PubK may be a public key associated with user A (the corresponding private key may be stored on User A's user device). $Sign_{BC\_PK}$ (U_A PubK) may be a digital signature that is the public key of user A, signed by a private key of the blockchain. Contract information may be data about the smart contract (e.g., types of services requested, a start and end date for the service). Contract_A ID may be an identifier for the smart contract and service interaction_A ID may be an identifier for the service interaction.

SP_A information may be the name and contact information for a service provider A. SP_A PubK may be a public key associated with service provider A (the corresponding private key may be stored in the service provider A's computer). $Sign_{BC\_PK}$ (SP_A PubK) may be a digital signature that is the public key of service provider A, signed by a private key of the blockchain. Bid_A information may be a bid value and a service date range. The data 416 may also comprise the contract_A ID and the service interaction_A ID. Similarly, data 418 may comprise corresponding information for a service provider B for another bid for the same smart contract. The data may comprise contract_A ID and service interaction_A ID as well.

It is noted that the Contract_A ID and the may represent an indentifier for a smart contract that may be stored elsewhere and may be retrieved when necessary, or may represent the smart contract itself, which may be stored on the blockchain. Further, it is noted that the contact information (e.g., phone number, e-mail addresses) for the service provider may be stored on the blockchain and may be retrieved by the user and/or service provider(s) so that they be directly contact each other after the smart contract is formed. In some cases, access to such information is only granted by the nodes of the blockchain after the final smart contract is formed.

Figure 5:
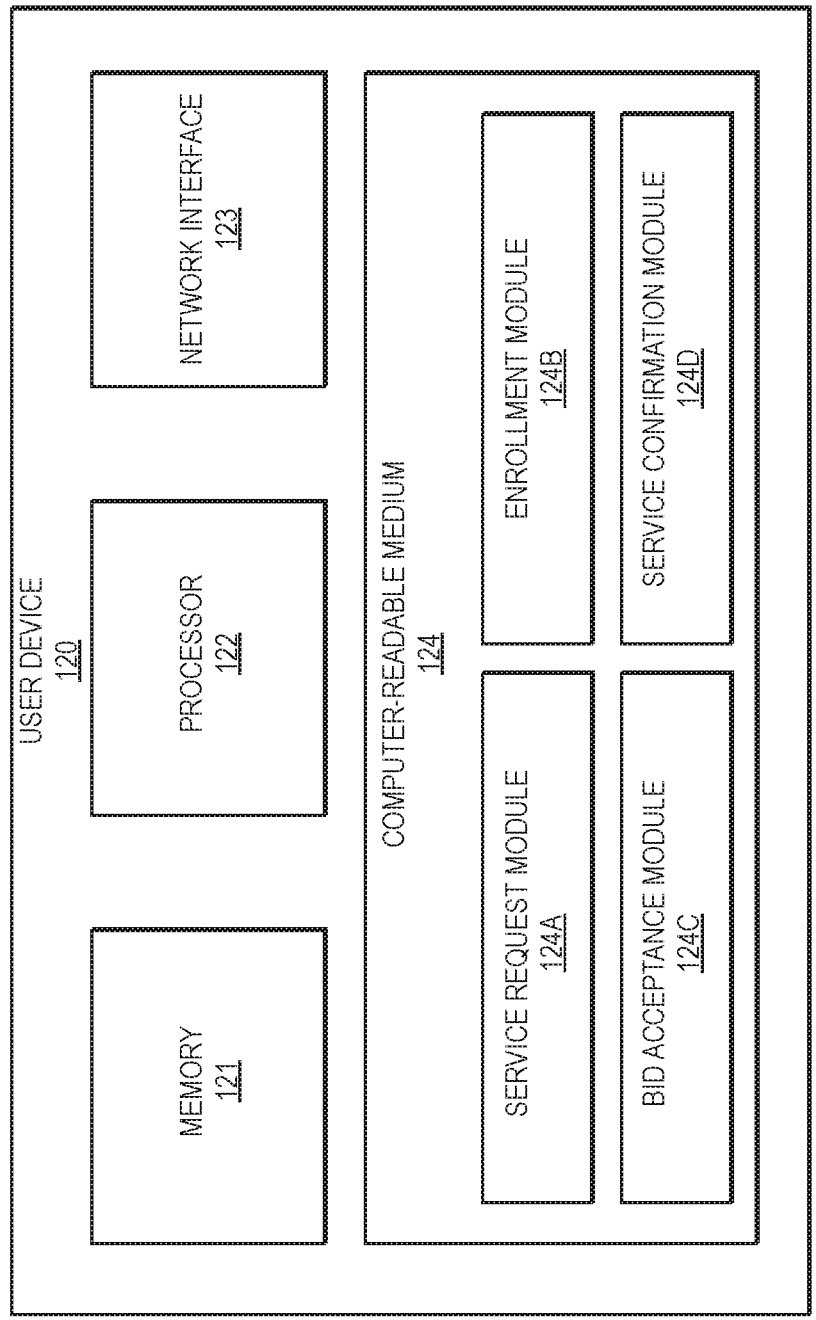
FIG. 5 is a block diagram of a user device according to embodiments.

FIG. 5 shows a block diagram of a user device 120 according to an embodiment. The user device 120 may comprise a memory 121, a processor 122, a network interface 123, and a computer-readable medium 124. These components may be similar to or different than the corresponding components in the interaction server computer 130 of FIG. 2. Computer-readable medium 124 may store code executable by the processor for implementing some or all of the functions of user device 120 described herein. The computer-readable medium 124 may comprise a service request module 124A, an enrollment module 124B, a bid acceptance module 124C, and a service confirmation module 124D. In some embodiments, memory 121 may store one or more cryptographic keys of the user (e.g., a private key, a public key). A cryptographic key may be used to digitally sign data associated with the user on the blockchain 400. The public key may be an identifier of the user.

The service request module 124A, in conjunction with the processor 122, can send service request messages to a node in computer network 190. A user may use the user device 120 to input a request for a service. The request may be input through, for example, a website or application of the interaction server computer 130. The user may select one or more services that they would like, and a date or range of dates for the service to be completed. For example, the user may input that they would like house cleaning services for a week. The service request module 124A may be part of the application. The service request module 124A, in conjunction with the processor 122, may send the service request message to the node in the computer network. In some embodiments, the user may be authenticated prior to sending a service request message. For example, the user may enter a password or a biometric measurement to be authenticated.

The enrollment module 124B, in conjunction with the processor 122, may enroll the user. The user may enter information into the enrollment module 124B. The user may enter a user identifier (e.g., a phone number, an email address) and account information for an account of the user (e.g., a PAN, an account number). In some embodiments, the enrollment module 124B, in conjunction with the processor 122, may authenticate the user before the user can enroll. The enrollment module 124B, in conjunction with the processor 122, may send the enrollment information to the interaction server computer 130.

The bid acceptance module 124C, in conjunction with the processor 122, may accept bids from service providers. The bid acceptance module 124C, in conjunction with the processor 122, may receive from a computer network node a selected bid placed by an identified service provider. The user may then indicate to the bid acceptance module 124C that they approve of the service provider or not. For example, a user may not approve of the particular service provider because the rating is low, or because the bid is higher than the user anticipated. The bid acceptance module 124C, in conjunction with the processor 122, may then send an indication to a computer network node that the bid has been accepted. Alternatively, the bid acceptance module 124C, in conjunction with the processor 122, may present a plurality of bids to the user. The user may then select a best bid for each service and enter their selection. In some embodiments, the user may be authenticated prior to accepting a bid. For example, the user may enter a password or a biometric measurement to be authenticated.

The service confirmation module 124D, in conjunction with the processor 122, may send an indication to a computer network node that a service has been completed. After a service is completed, the user may mark that the service has been completed satisfactorily. For example, after receiving lawn care services from a landscaping provider, the user may indicate with the service confirmation module 124D if the service has been completed satisfactorily or not. The service confirmation module 124D, in conjunction with the processor 122, may then send the indication to a computer network node (e.g., an interaction server computer 130, a blockchain node 150). In some embodiments, the user may be authenticated prior to sending a service confirmation. For example, the user may enter a password or a biometric measurement to be authenticated.

Figure 6:
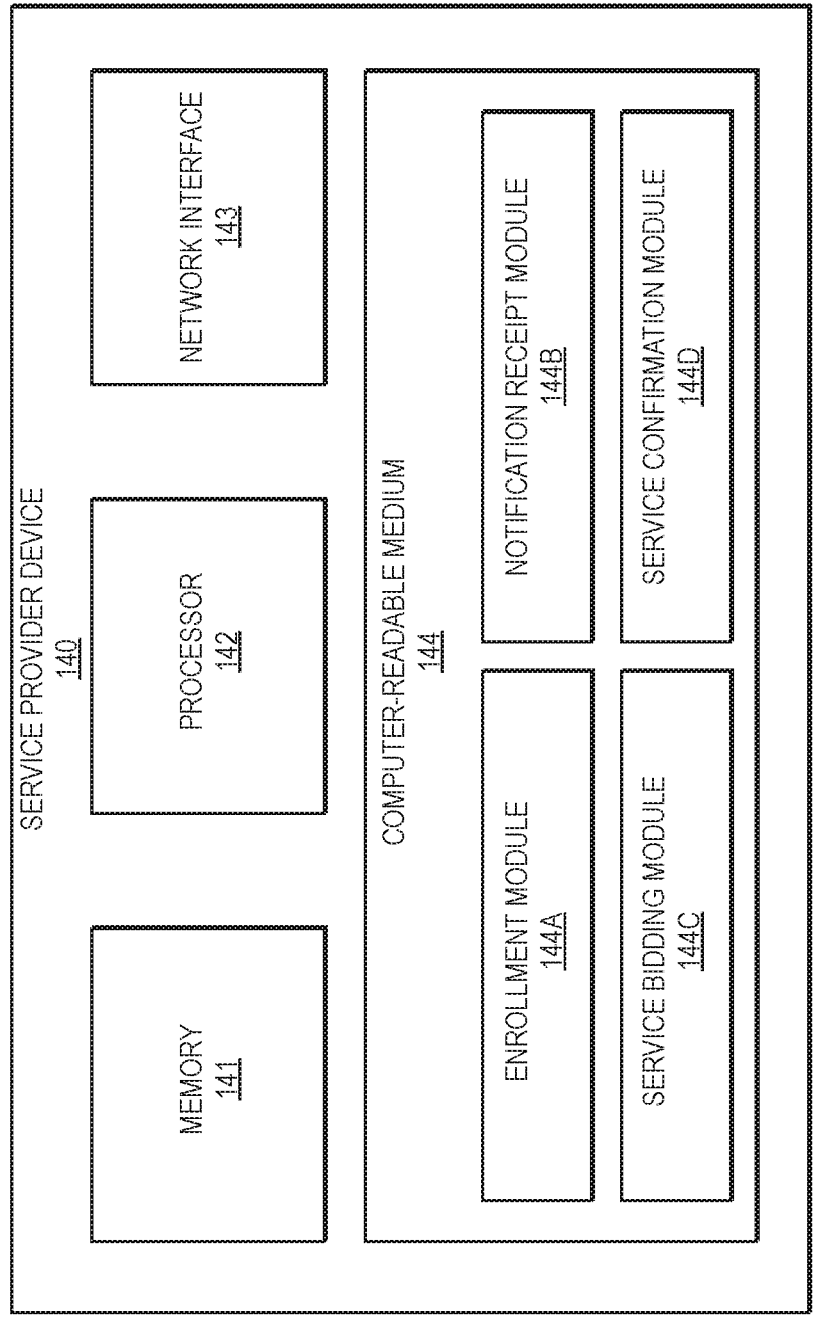
FIG. 6 is a block diagram of a service provider device according to embodiments.

FIG. 6 shows a block diagram of a service provider device 140 according to an embodiment. The service provider device 140 may comprise a memory 141, a processor 142, a network interface 143, and a computer-readable medium 144. These components may be similar to or different than the corresponding components in the interaction server computer 130 of FIG. 2. Computer-readable medium 144 may store code executable by the processor 142 for implementing some or all of the functions of service provider device 140 described herein. The computer-readable medium 144 may comprise an enrollment module 144A, a notification receipt module 144B, a service bidding module 144C, and a service confirmation module 144D. In some embodiments, memory 141 may store one or more cryptographic keys of the service provider (e.g., a private key, a public key). A cryptographic key may be used to digitally sign data associated with the service provider on the blockchain 400. The public key may be an identifier of the service provider.

The enrollment module 144A, in conjunction with the processor 142 may enroll the service provider. may enroll the user. The service provider may enter information into the enrollment module 144A. The service provider may enter a user identifier (e.g., a phone number, an email address) and account information for an account of the service provider (e.g., a PAN, an account number). The service provider may also indicate one or more types of services. For example, a service provider may enter that they can mow lawns and walk dogs. The enrollment module 144A, in conjunction with the processor 142, can send the enrollment information to interaction server computer 130.

The notification receipt module 144B, in conjunction with the processor 142, may notify the service provider of service requests. The notification receipt module 144B may notify the service provider of service requests applicable to the service provider. For example, requests for service of the type done by the service provider. As another example, the service provider may also chose to receive notifications for service requests for certain days. The notification receipt module 144B, in conjunction with the processor 142, may also receive notifications of accepted bids. In some embodiments, the notification receipt module 144B may make use of a service such as Twilio.

The service bidding module 144C, in conjunction with the processor 142, can submit bids from the service provider to a computer network node (e.g., an interaction server computer 130, a blockchain node 150). The service provider may be able to respond to notifications about service requests with bids of a price for completing the service. The bid may also include a time or date when the service provider can complete the service. For example, if the service request includes a date range of one week, the bid may include a date within that week that the service can be completed. The service bidding module 144C, in conjunction with the processor 142, may allow the service provider to bid multiple times, such as in response to a lower bid from a competing service provider.

The service confirmation module 144D, in conjunction with the processor 142, may send an indication to a computer network node that a service has been completed. After a service is completed, the service provider may mark that the service has been completed. For example, after providing lawn care services for a user, the service provider may indicate with the service confirmation module 144D that the service has been completed. The service confirmation module 144D, in conjunction with the processor 142, may then send the indication to a computer network node (e.g., an interaction server computer 130, a blockchain node 150).

Before requesting services, a user may enroll with an interaction server computer. Before receiving notifications service requests, a service provider may also enroll with an interaction server computer. Both the user and the service provider may also enroll through a blockchain node. In some embodiments, an entity, whether a user or a service provider, may go through the same enrollment process. The entity may send an identifier (e.g., a name, an ID number) and an account identifier (e.g., an account token, a primary account number (PAN)) with a user device or a service provider device. In some embodiments, the entity may also send a card verification value (CVV) to verify the account identifier. As part of enrollment, the entity may select if they are a service provider or a user. A service provider may also send information regarding one or more types of services that the service provider can complete (e.g., dog walking an pet sitting). In some embodiments, the interaction server computer can map the identifier to the account identifier (e.g., using an alias directory). The entity can also send an email address or phone number for receiving notifications.

Figure 7:
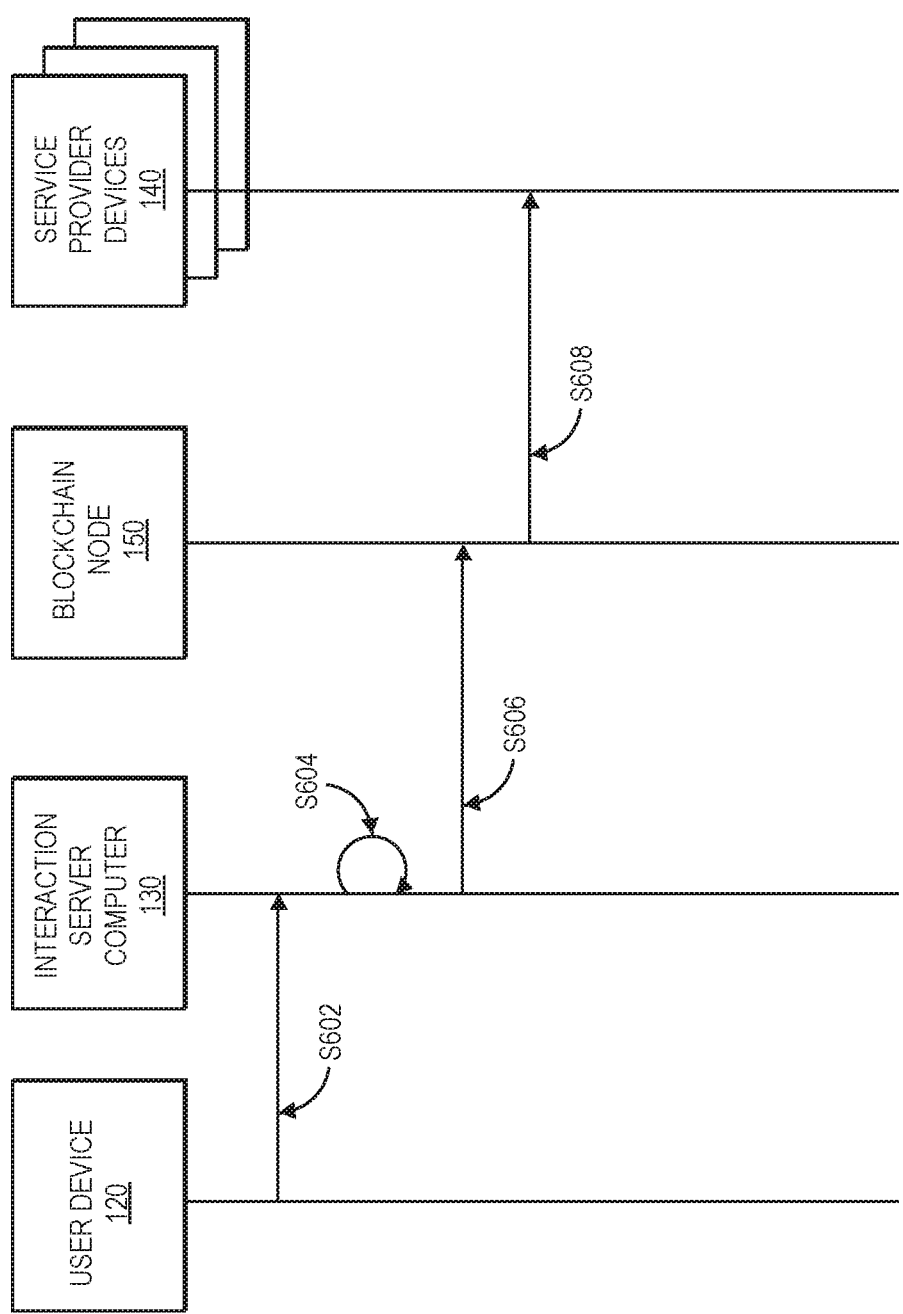
FIG. 7 is a swim lane diagram of smart contract generation according to embodiments.

FIG. 7 shows a swim lane diagram of a service request process according to embodiments. For example, a user may be going on vacation for a week and may be looking for someone to take care of their pets and someone to take care of their garden while they are gone. The process is shown with particular computer network nodes (i.e., an interaction server computer 130 and a blockchain node 150). However, other embodiments may use different computer network nodes. For example, a user device 120 may interact directly with a blockchain node 150.

In step S602, the user device 120 may send a service request message to the interaction server computer 130 with information about services requested by the user. The service request may include a date for the requested services and the types of services requested (e.g., "lawn mowing", "dog walking"). The date may be, for example, a range of dates (e.g., April 15-April 20) or a recurring date (e.g., every Monday for 6 weeks). The user may enter the service request through a mobile application on the user device 120. The service request message may also include account information of the user. For example, the service request message may include an account number, a Bitcoin wallet address/key, or an account token. The service request message may include a public key of the user. The user may also be able to set a maximum bid for the smart contract. The service request message may also have an end date for the auction. The end date may be a default value (e.g., one week) or may be set by the user. In some embodiments, the auction end date may depend on the start date of the service (e.g., no later than three days before the service start date). The service request message may also have a service interaction ID, an identifier to track the service request through to completion. In some embodiments, the user may need to authenticate themselves before sending a service request message. For example, the user may enter a password into the user device 120.

The service request message may also include preferences from the user about what service providers the user would like. For example, the user may indicate that they only wish to receive bids from service providers that have completed at least 20 other service jobs or that have a satisfaction rating from other users of at least 75%. If the user is requesting a plurality of services, there may be different criteria for each service. For example, the user may only wish to receive bids on a childcare service from service providers with an approval rating higher than 90% but may accept bids on lawn care services from service providers with lower approval ratings or may set no approval rating limit.

In step S604, the interaction server computer 130 may create a smart contract based on the service request message. The smart contract may comprise a user identifier, a contract ID, a service start date and end date, and an auction end date. The smart contract may be partially populated with the user account information and the date for the requested service. The smart contract may also have terms for escrow and/or other accountability measures. The smart contract may also comprise a service interaction ID. The user may control the auction, so the user may be the only entity that can cancel the auction. In some embodiments, the interaction server computer 130 may also be able to cancel or edit the auction.

In step S606, the interaction server computer 130 may provide the smart contract to a blockchain node 150 in a blockchain network. The smart contract may then be provided to one or more blocks in the blockchain by the blockchain node 150. The block may store information about the smart contract (e.g., user identifier, a contract ID, a service start date and end date, and an auction end date). The blockchain node 150 may sign the one or more blocks or elements of the blocks using a private key of the blockchain node 150, and optionally the public key of the user. The interaction server computer 130 may also send information regarding the types of services requested by the user to the blockchain node 150. If the interaction server computer 130 is part of the blockchain network, the interaction server computer 130 may provide the smart contract to the blockchain directly. Each blockchain node 150 in the blockchain network may then receive the smart contract.

In step S608, one or more blockchain nodes 150 may provide a notification of the service request to a plurality of service provider devices 140. For example, the service provider devices 140 may be registered with the blockchain network and may receive notifications of service requests (e.g., via SMS, email). The notification may include the service type, the service start date and end date, the auction end date, and the contract ID. The service provider devices 140 may receive notifications of relevant service requests that have the same type as the service provider (e.g., a service provider device of a dog walker may only receive notifications of dog walking requests). In some embodiments, the notification may be sent to the service provider devices 140 through blockchain nodes 150 that are service platforms. For example, if one service requested is dog walking, a pet care service platform may send a notification to service provider devices 140 registered with the service platform. The service provider devices 140 may each have an mobile application for the service platform. In other embodiments, the service providers may be able to see a list of active auctions. The service provider devices 140 may receive a notification that the list of active auctions has been updated.

Figure 8:
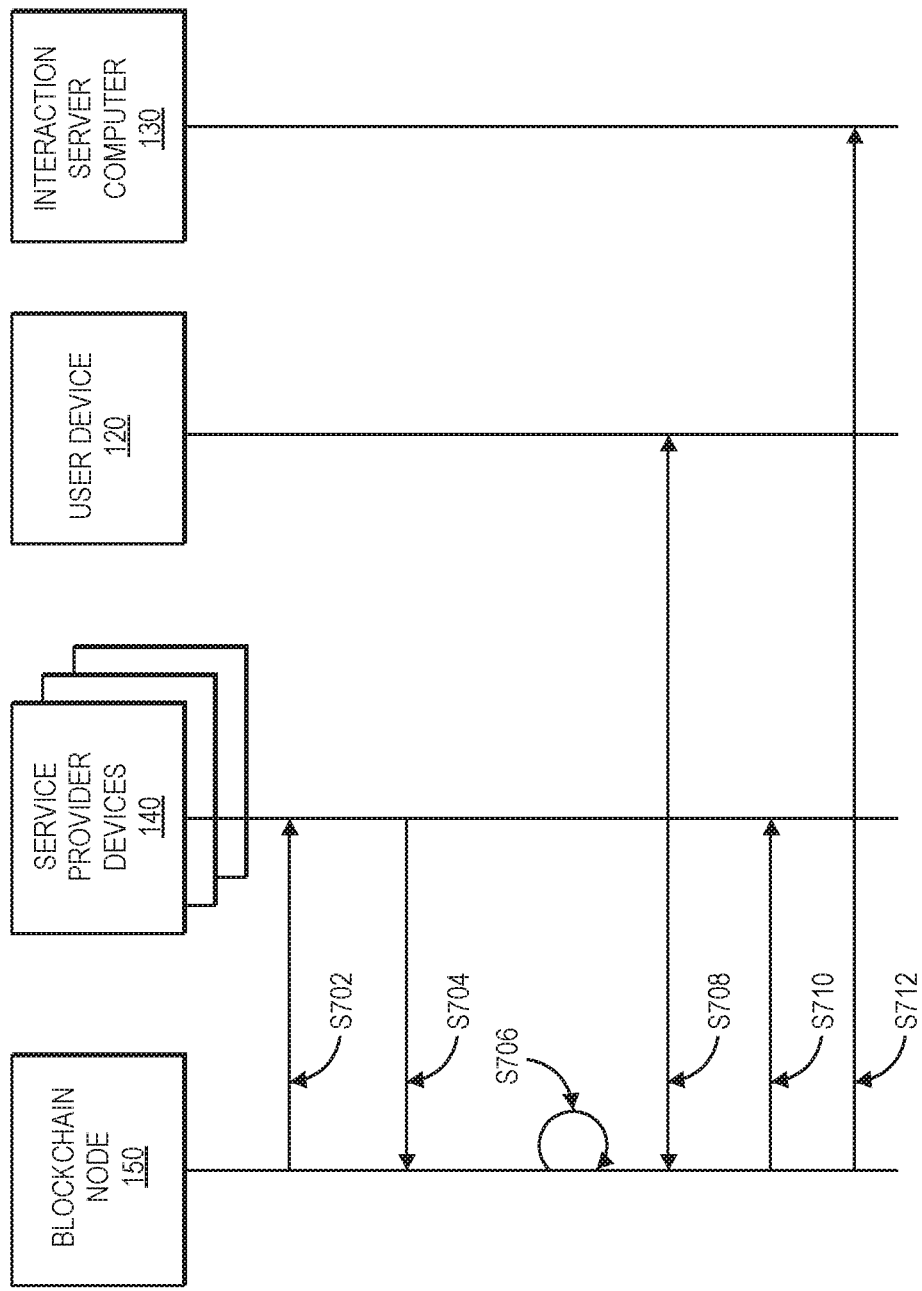
FIG. 8 is a swim lane diagram of smart contract bidding according to embodiments.

FIG. 8 shows a swim lane diagram of bidding on a service request, according to embodiments. In some embodiments, another computer network node (e.g., an interaction server computer) may perform some or all of the steps of the blockchain node 150.

In step S702, a blockchain node 150 can send a notification of a service request to a plurality of service provider devices 140. This may be a similar or different process as step S608 of FIG. 7.

In step S704, a service provider device 140 can send a bid to blockchain node 150 in response to the notification of the service request. The bid may include a bid value at which the service provider is willing to complete the service, a service provider identifier, the service interaction ID, and the contract ID. The bid may include a public key of the service provider. The bid may also include a bid date range. This can be the range of dates when the service can be completed. In some embodiments, each service provider may be able to see other bids placed by other service provider devices. Service providers may be able to select what service requests they wish to bid on. Service provider devices 140 may be able to send multiple bids, such as in response to competing bids from other service provider devices. If there are multiple services requested by the user, service provider devices 140 may be able bid on separate services. For example, a user may be requesting dog walking and lawn mowing, and the service provider device 140 may only send a bid for the dog walking service. Each bid that is sent to the blockchain node 150 may be provided to one or more blocks in the blockchain. Each block may comprise the service provider identifier, the bid, and the time and date when the bid was received. In some embodiments, blockchain node 150 may sign the one or more blocks or elements of the blocks using a private key of the blockchain node 150, and optionally the public key of each service provider. In some embodiments, the user device 120 may receive a notification when each bid is received.

In step S706 the blockchain node 150 may determine the best bid of the bids received from the plurality of service provider devices 140. For example, the blockchain node may select the lowest bid value. As part of selecting the best bid, the blockchain node 150 can very that the service bid date is within the requested date. The blockchain node 150 may take additional criteria into account when selecting a bid. Associated with the service provider may be data about ratings, service completion rates, number of service jobs completed, etc. This data may be stored in and/or be retrievable from one or more blocks in the blockchain. The blockchain node 150 may then select, for example, the lowest bid value among service providers with a rating higher than 90%. The blockchain node 150 may take into account preferences indicated by the user in the service request message when selecting the bid. If there are multiple services being requested, the blockchain node 150 may select a service provider for each service. After determining the best bids, the blockchain node 150 may identify one or more service providers associated with the best bids from the plurality of service providers.

In step S708, the blockchain node 150 can send a bid approval message to the user device 120. For example, the bid may be displayed on the application of the interaction server computer, or may be sent as an SMS message. The bid approval message may comprise an identifier of each of the one or more identified service providers and the best bids for each service. The bid approval message may also include other information about the identified service providers, such as an approval rating. The user may then indicate approval of the bid, such as by tapping a button on the mobile application or responding to the SMS message. If the user indicates that they do not approve of the bid, the blockchain node 150 may then repeat S706 to select a different bid and identify a new service provider. The user may be able to decline a particular service provider of the identified service providers.

In some embodiments, the user may select the bid directly. As the blockchain node 150 receives bids from the service provider devices 140 in S704, the user device 120 may receive notifications about the bids from the blockchain node 150. In some embodiments, the bids may be displayed on the application on the user device 120. The user may then be able to select one or more bids. The user device 120 may then send a message to the blockchain node 150 with the identified service providers.

In step S710, the blockchain node 150 can notify the identified service providers of a successful bid. If the blockchain node 150 does not already have an account identifier for one or more of the identified service providers, the blockchain node 150 may request the account identifier. The service provider device 140 may then respond with the account identifier.

In step S712, the blockchain node 150 can send information about the identified service providers to the interaction server computer 130. The blockchain node 150 may send service provider identifiers for the identified service providers and account identifiers of the identified service providers. In some embodiments, the blockchain node 150 may update the smart contract with the information about the identified service providers. The updated smart contract may then include best bid values, identifiers of identified service providers, a user identifier, a service start date and end date, a contract ID, and a service interaction ID. The updated smart contract may be provided to one or more blocks in the blockchain. The one or more blocks containing the updated smart contract may be signed with a private key of the blockchain node 150 and the public key of the user and/or the public key of each of the the identified service providers. Then the blockchain node 150 may notify the interaction server computer 130 that the smart contract has been updated. Alternatively, the interaction server computer 130 may update the smart contract and provide it to one or more blocks in the blockchain.

Figure 9:
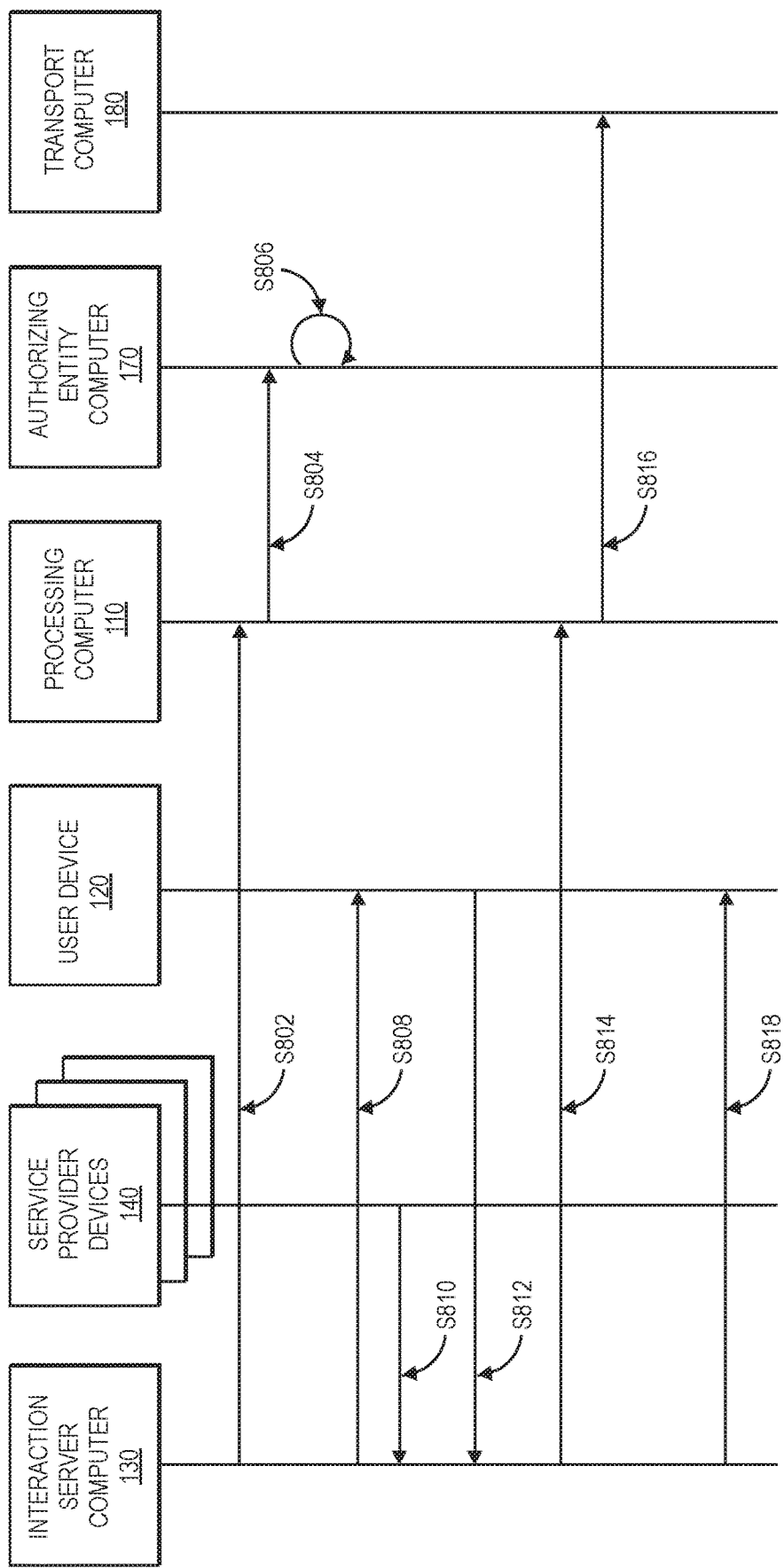
FIG. 9 is a swim lane diagram of a value interaction after completion of a service according to embodiments.

FIG. 9 shows a swim lane diagram of a value interaction after the completion of a service by the one or more identified service providers.

In embodiments of the invention, the value interaction may push value from the user to the one or more identified service providers, such as through an AFT/OCT process. In an AFT/OCT process, an AFT message is first sent by a processing computer to a payer's bank (e.g., the authorizing entity computer 170 in FIG. 1). Sometime after the AFT message is approved by the payer's bank, the service provider transmits an OCT message to the payee's bank (e.g., the transport computer 180 in FIG. 1). A clearing and settlement process occurs at a later time. In some cases, the AFT/OCT process can be used in cases where the payer and the payee banks are both issuers of payment cards. The payee can have a payment card that can be used to both make and receive payments.

In step S802, an interaction server computer 130 may send a message to a processing computer 110 indicating that the smart contract has been generated and updated. The message to the processing computer 110 may include the cost of the service, an account identifier of the user, one or more account identifiers of the one or more service providers, a service interaction ID, a transaction ID, and the end date of the smart contract.

In step S804, the processing computer 110 may determine an authorizing entity computer 170 based on the account identifier of the user. The authorizing entity computer 170 may maintain an account of the user. The processing computer 110 may then send an AFT message to the authorizing entity computer 170, comprising the total bid value, the service interaction ID, and the transaction ID. The AFT message may comprise a field with a business application ID (BAI) for service smart contract transactions. The BAI can affect transaction fees, risk calculations, velocity limits and the like. The BAI can affect the data processing of the transaction message. For example, there may be lower or less stringent risk analysis processes. The lower risk may be because the user had an extended period of time to review the smart contract.

An AFT (Account Funding Transaction) is a transaction designed to debit an account. In embodiments, an AFT is paying a processing network (e.g., a payment processing network) for sending funds to the recipient and results in a debit to a sender's account (e.g., a payment card account). The amount of the debit is the amount of the credit to be delivered to the recipient plus any fees being charged by the processing network such as a transfer fee, or a currency conversion fee when the money transfer portal performs currency exchange and its acquirer submits the transaction in the preferred currency of the recipient.

An AFT indicator can used in both the authorization and clearing and settlement transactions and is preceded by an authorization. Settlement can take place within two working days. Neither the authorization nor the clearing transaction carries any financial information about the recipient of a money transfer. An AFT is also accompanied by indicators, which allow the sender's card issuing bank to make appropriate authorization decisions. Indicators include channel information such as Mail Order/Telephone Order or Internet, and service provider type. A financial services association (such as Visa) can perform currency conversion on AFTs when the currency of the sender is different from the currency accepted by the service provider. AFT indicators are used to show funds transfers instead of standard purchase transactions. The following can be key fields used for an AFT and can be supported in messages and clearing and settlement transactions. The key fields are: Processing Code; Merchant Type; CAVV Result Code; Mail Order/Telephone Order/Electronic Commerce Indicator; Mail/Phone/Electronic Commerce Indicator; Transaction ID (XID); and CAVV Data.

In step S806, the authorizing entity computer 170 may complete the AFT. The funds from the user account may be held in an escrow account. The escrow account may be set up with the term from the smart contract (e.g., the end date of the smart contract). In some embodiments, the escrow account may be held at the authorizing entity computer 170. In other embodiments, the escrow account may be held at the processing computer 110. The interaction server computer 130 may then receive a notification that the escrow account has been established. In some embodiments, the notification may be sent by the processing computer 110 or the authorizing entity computer 170.

In step S808, the interaction server computer 130 can send a notification to the user device 120 that the funds have been pulled from the user account and held in escrow. In some embodiments, the notification may be sent by the processing computer 110 or the authorizing entity computer 170. In some embodiments, the service provider devices 140 may also receive a notification that the funds have been pulled from the user account. This may prompt the one or more service providers to begin the service.

In step S810, after the service is completed by the service provider, the service provider devices 140 may send a notification of a completed service to the interaction server computer 130. In some embodiments, this may be done through an interface on an application on the service provider devices 140 or as an SMS message. In embodiments where the service provider is associated with a service platform that is a blockchain node 150, the service provider devices 140 may send the notification to the blockchain node 150. For example, the service provider devices 140 may have an application of the service platform. The blockchain node may then send the notification to the interaction server computer 130. In some embodiments, the user device 120 may then receive a notification from the interaction server computer 130 that the service has been completed (e.g., a notification that a service provider is done cleaning a user's home while the user is on vacation).

In step S812, the user device 120 may send a notification of a completed service to the interaction server computer 130. In some embodiments, this may be done through an interface on an application on the user device 120 or as an SMS message. In some embodiments, the user may need to authenticate themselves before sending the notification of the completed service. For example, the user may need to enter a password into the user device 120. This may prevent a malicious entity from prematurely releasing the funds from escrow before the service is completed. In some embodiments, the user device 120 may also send information about the service and/or the service provider. For example, the user may be able to enter a rating for the service done by the service provider. In some embodiments, step S804 may occur before step S802.

In step S814, the interaction server computer 130 may initiate a value interaction. The interaction server computer 130 may send a value interaction message to the processing computer 110. The value interaction message may comprise a user identifier, an account identifier for an account of the user, a service provider identifier, an account identifier for an account of the service provider, and the value for the service.

In embodiments, the value interaction may be initiated after a onetime service (such as after a lawn has been mowed) or after a repeated series of service jobs (such as a at the end of a week of pet sitting). If the service is ongoing (e.g., a weekly dog walker) the value interaction may be initiated done after every service job, after a predetermined time period (e.g., monthly), or at some other time. The timing of the value interaction may be in the smart contract between the user and the identified service providers. If the user requested multiple services, there may be a smart contract for each service provider, and the services may be completed at different times.

In step S816, the processing computer 110 can determine one or more transport computers 180. The processing computer 110 can send the information to the transport computer 180. The processing computer 110 may then send an OCT message to the transport computer 180. The funds from the OCT transaction may come from the escrow fund. The OCT message may also comprise a business application ID (BAI) for the smart contract.

An OCT (Original Credit Transaction) can be used to deliver funds to the recipient account. It is separate from, and takes place after, the AFT. This timing is to ensure that payment funds are secured before funds are sent to the recipient.

The amount of the OCT is the amount agreed by the sender and the processing network in the currency agreed. If the recipient's billing currency is different from the currency agreed at the transaction time, currency conversion is performed on the OCT and the exact amount credited to the recipient account will not be known at transaction time. In some embodiments, the OCT carries only the account number of the recipient and no information about the sender. A special indicator identifies an OCT to the recipient's issuer bank. Interchange can flow from the submitting acquirer to the recipient's issuer, as in a normal purchase transaction. Settlement can take place within a few days.

In step S818, the interaction server computer 130 may send a notification to the user device 120 and the one or more service provider devices 140 that the value interaction has been completed.

Embodiments can provide a number of advantages. This can streamline the process because the user can request things from a number of service providers at once. Use of a blockchain may provide security and accountability. Service interactions can be difficult to arbitrate in the case of a dispute, but by using a blockchain network, that can be minimized as all entities can see what each smart contract was. This may allow for an immutable and transparent record of the smart contract, which may help keep the service providers accountable.

The value interactions used in embodiments may also provide advantages. A value interaction that pushes payments allows a user to pay service providers after the service has been completed. Additionally, a push transaction may not allow for refunds or chargebacks because it is user initiated. This may be especially suited for embodiments as the user cannot return a service once it has been completed. The user may have several opportunities for confirming and reviewing the transaction before it happens, in addition to the use of escrow, further reducing the need for refunds.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
creating, by one or more nodes in a computer network, a smart contract in response to a request from a user to obtain one or more services;
providing, by the one or more nodes in the computer network, the smart contract to one or more blocks in a blockchain on one or more nodes in a blockchain network;
providing, by the one or more nodes in the computer network, notifications to a plurality of service providers in accordance with the smart contract;
receiving, by the one or more nodes in the computer network, responses to the notifications from the plurality of service providers;
identifying, by the one or more nodes in the computer network, one or more service providers from the plurality of service providers;
updating, by the one or more nodes in the computer network, the smart contract to include data relating to the one or more identified service providers, the updated smart contract including account information for a user account of the user, and account information for service provider accounts of the one or more identified service providers, wherein the user account is issued by an authorization computer of an authorizing entity that is outside of the blockchain network, wherein the service provider accounts are issued by one or more entities outside of the blockchain network; and
performing, by the one or more nodes in the computer network, an account funding transaction (AFT) and an original credit transaction (OCT) that pushes value from the user account to the service provider accounts, wherein the AFT includes:
sending, by the one or more nodes in the computer network, a message to a processing computer indicating that the smart contract has been generated and updated, and requesting the authorization computer of the authorizing entity that issued the user account of the user to pull the value from the user account and place the value in escrow with the processing computer;
receiving, by the one or more nodes in the computer network, an indication from the one or more identified service providers that the one or more services identified in the smart contract are completed;
wherein the OCT includes:
sending, by the one or more nodes in the computer network, a message to the processing computer indicating that the smart contract has been completed and requesting the processing computer to transfer the value to the service provider accounts issued by one or more entities outside of the blockchain network.

2. The method of claim 1, wherein the computer network comprises a blockchain network.

3. The method of claim 1, wherein the computer network comprises an interaction server computer.

4. The method of claim 1, wherein performing the AFT and OCT comprises:
receiving, by the one or more nodes in the computer network, an indication from the user that the one or more services were completed.

5. The method of claim 4, wherein the value pulled from the account of the user is held in escrow.

6. The method of claim 4, wherein the account funding transaction message and/or the original credit transaction message comprises a business application ID.

7. The method of claim 1, wherein identifying one or more service providers is based on one or more of a bid value, a service provider rating, and a service completion rate.

8. A computer network node comprising:
a processor; and
a computer-readable medium, coupled to the processor, comprising code, executable by the processor to implement a method comprising:
creating a smart contract in response to a request from a user to obtain one or more services;

providing the smart contract to one or more blocks in a blockchain on one or more nodes in a blockchain network;

providing notifications to a plurality of service providers in accordance with the smart contract;

receiving responses to the notifications from the plurality of service providers;

identifying one or more service providers from the plurality of service providers;

updating the smart contract to include data relating to the one or more identified service providers, the updated smart contract including account information for a user account of the user, and account information for service provider accounts of the one or more identified service providers, wherein the user account is issued by an authorization computer of an authorizing entity that is outside of the blockchain network; wherein the service provider accounts are issued by one or more entities outside of the blockchain network; and performing an account funding transaction (AFT) and an original credit transaction (OCT) a value interaction that pushes value from the user account to the service provider accounts, wherein the AFT includes:
sending, by the one or more nodes in the computer network, a message to a processing computer indicating that the smart contract has been generated and updated, and requesting the authorization computer of the authorizing entity that issued the user account of the user to pull the value from the user account and place the value in escrow with the processing computer;

receiving, by the one or more nodes in the computer network, an indication from the one or more identified service providers that the one or more services identified in the smart contract are completed;

wherein the OCT includes:
sending, by the one or more nodes in the computer network, a message to the processing computer indicating that the smart contract has been completed and requesting the processing computer to transfer the value to the service provider accounts issued by one or more entities outside of the blockchain network.

9. The computer network node of claim 8, wherein the computer network node is a node in a blockchain network.

10. The computer network node of claim 8, wherein the computer network node is an interaction server computer.

11. The computer network node of claim 8, wherein performing the AFT and OCT comprises:
receiving an indication from the user that the one or more services were completed.

12. The computer network node of claim 11, wherein the value pulled from the account of the user is held in escrow.

13. The computer network node of claim 11, wherein the account funding transaction message and/or the original credit transaction message comprises a business application ID.

14. The computer network node of claim 8, wherein identifying one or more service providers is based on one or more of a bid value, a service provider rating, and a service completion rate.

15. The method of claim 1, wherein a clearing and settlement process takes place after the value is transferred to the service provider accounts.

16. The method of claim 1, further comprising:
storing a first set of cryptographic keys and a second set of cryptographic keys;

digitally signing data associated with the user with the first set of cryptographic keys; and digitally signing data associated with the one or more identified service providers with the second set of cryptographic keys, wherein the updated smart contract includes the account information for the user account of the user digitally signed using the first set of cryptographic keys, and the account information for the service provider accounts of the one or more identified service providers digitally signed using the second set of cryptographic keys.

* * * * *

UNITED STATES PATENT AND TRADEMARK OFFICE
CERTIFICATE OF CORRECTION

PATENT NO. : 11,556,923 B2
APPLICATION NO. : 16/422510
DATED : January 17, 2023
INVENTOR(S) : Kadarmandalgi et al.

It is certified that error appears in the above-identified patent and that said Letters Patent is hereby corrected as shown below:

In the Claims

Column 21, Lines 22-23, after "(OCT)", delete "a value interaction".

Signed and Sealed this
Eleventh Day of April, 2023

Katherine Kelly Vidal
*Director of the United States Patent and Trademark Office*